US012798559B2

(12) United States Patent
Onitsuka

(10) Patent No.: US 12,798,559 B2
(45) Date of Patent: Nov. 17, 2026

(54) VEHICLE CONTROL DEVICE AND VEHICLE CONTROL METHOD

(71) Applicant: TOYOTA JIDOSHA KABUSHIKI KAISHA, Toyota (JP)

(72) Inventor: Masakatsu Onitsuka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/050,269

(22) Filed: Feb. 11, 2025

(65) Prior Publication Data

US 2026/0021804 A1 Jan. 22, 2026

(30) Foreign Application Priority Data

Jul. 18, 2024 (JP) ................................ 2024-114631

(51) Int. Cl.
*B60W 30/08* (2012.01)
*B60W 10/04* (2006.01)
*B60W 10/18* (2012.01)

(52) U.S. Cl.
CPC ............ *B60W 30/08* (2013.01); *B60W 10/04* (2013.01); *B60W 10/18* (2013.01); *B60W 2030/082* (2013.01); *B60W 2540/10* (2013.01)

(58) Field of Classification Search
CPC ...... B60W 10/04; B60W 10/18; B60W 30/08; B60W 2030/082; B60W 2540/10; B60W 2540/12; B60W 2540/16; B60W 2540/18; B60W 30/18109; B60W 40/08; B60W 60/007; B60W 2040/0818; B60W 2720/106; B60W 2756/10; B60T 7/12; B60T 7/22
USPC .................. 701/42, 43, 45–47, 70; 180/204, 180/167–169, 446; 318/587
See application file for complete search history.

(56) References Cited

U.S. PATENT DOCUMENTS 6,018,692 A * 1/2000 Shimizu ............ B62D 15/0285 318/587
7,882,920 B2 * 2/2011 Nitta ........................ B60T 7/14 477/170
11,565,668 B2 * 1/2023 Aitidis ................. B60W 10/18
(Continued)

FOREIGN PATENT DOCUMENTS

JP 2021-112982 A 8/2021

*Primary Examiner* — Hai H Huynh
*Assistant Examiner* — Johnny H Hoang
(74) *Attorney, Agent, or Firm* — SoraIP, Inc.

(57) ABSTRACT

A vehicle control device comprising: an accelerator sudden depression operation determination unit for determining whether a sudden depression operation of an accelerator pedal by a driver of the vehicle has been performed; a light collision determination unit for determining whether a light collision has occurred in the vehicle; and a control unit for executing a secondary collision damage reduction control when a control execution condition for determining that a light collision has occurred in the vehicle is satisfied by the light collision determination unit, wherein the control device includes a parking lot determination unit for judging whether a vehicle exists in a parking lot, and changes a control mode including at least one of control execution contents of the secondary collision damage reduction control, and control execution conditions according to a judgment result of the parking lot determination unit.

5 Claims, 3 Drawing Sheets

(56) References Cited

U.S. PATENT DOCUMENTS

| | | | | |
|---|---|---|---|---|
| 11,667,276 | B2 * | 6/2023 | Kumazawa | B60W 30/06 701/70 |
| 2013/0138316 | A1 * | 5/2013 | Koyama | B60T 8/1755 701/70 |
| 2021/0221364 | A1 | 7/2021 | Mase et al. | |
| 2021/0221365 | A1 | 7/2021 | Mase et al. | |

* cited by examiner

VEHICLE CONTROL DEVICE AND VEHICLE CONTROL METHOD

CROSS-REFERENCE TO RELATED APPLICATION

This application claims priority to Japanese Patent Application No. 2024-114631 filed on Jul. 18, 2024. The disclosure of the above-identified application, including the specification, drawings, and claims, is incorporated by reference herein in its entirety.

BACKGROUND

1. Technical Field

The present disclosure relates to a vehicle control device and a vehicle control method.

2. Description of Related Art

Japanese Unexamined Patent Application Publication No. 2021-112982 (JP 2021-112982 A), for example, discloses a driving assistance device. The driving assistance device performs secondary collision damage reduction control, in which a braking force is generated in the host vehicle or a driving force of the host vehicle is suppressed, when a sudden depression operation of an accelerator pedal is detected and a low-level light collision in which airbags do not deploy is detected.

SUMMARY

When a driver performs an erroneous operation of suddenly depressing the accelerator pedal in a parking lot, the vehicle is highly likely to collide with a surrounding target in a state of having just started at an extremely low speed. Therefore, there is a possibility that the acceleration at the time of collision between the vehicle and the surrounding target is low, and that a determination condition for detecting a light collision is not satisfied. In addition, it is difficult to accurately determine whether the sudden depression operation of the accelerator pedal is an operation intended by the driver or an unintended erroneous operation. Therefore, when the driver intentionally suddenly operates the accelerator pedal, the driver may feel uncomfortable due to unnecessary operation, if a braking force is applied by the secondary collision damage reduction control. That is, it can be said that there is room for improvement in appropriate operation of the secondary collision damage reduction control.

The present disclosure aims to optimize the operation of the secondary collision damage reduction control.

An aspect of the present disclosure provides a vehicle control device including: an accelerator sudden depression operation determination unit that determines whether a sudden depression operation of an accelerator pedal is performed by a driver of a vehicle; a light collision determination unit that determines whether a light collision has occurred in the vehicle; and a control unit that executes at least one of driving force suppression control for suppressing a driving force of the vehicle and braking force generation control for generating a braking force in the vehicle, as secondary collision damage reduction control, when a control execution condition that the accelerator sudden depression operation determination unit determines that a sudden depression operation of the accelerator pedal was performed within a predetermined time and the light collision determination unit determines that a light collision has occurred in the vehicle is satisfied. A parking lot determination unit that determines whether the vehicle is present in a parking lot is included, and a control mode including at least one of a content of control executed as the secondary collision damage reduction control and the control execution condition is changed in accordance with a result of a determination by the parking lot determination unit.

An aspect of the present disclosure provides a vehicle control method of executing at least one of driving force suppression control for suppressing a driving force of a vehicle and braking force generation control for generating a braking force in the vehicle, as secondary collision damage reduction control, when a control execution condition that a sudden depression operation of an accelerator pedal was performed by a driver of the vehicle within a predetermined time and it is determined that a light collision has occurred in the vehicle is satisfied, the vehicle control method including executing a parking lot determination as to whether the vehicle is present in a parking lot, and changing a control mode including at least one of a content of control executed as the secondary collision damage reduction control and the control execution condition in accordance with a determination result of the parking lot determination.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a vehicle control device and a vehicle control method according to the present embodiment will be described with reference to the drawings.

Hardware Configuration

Figure 1:
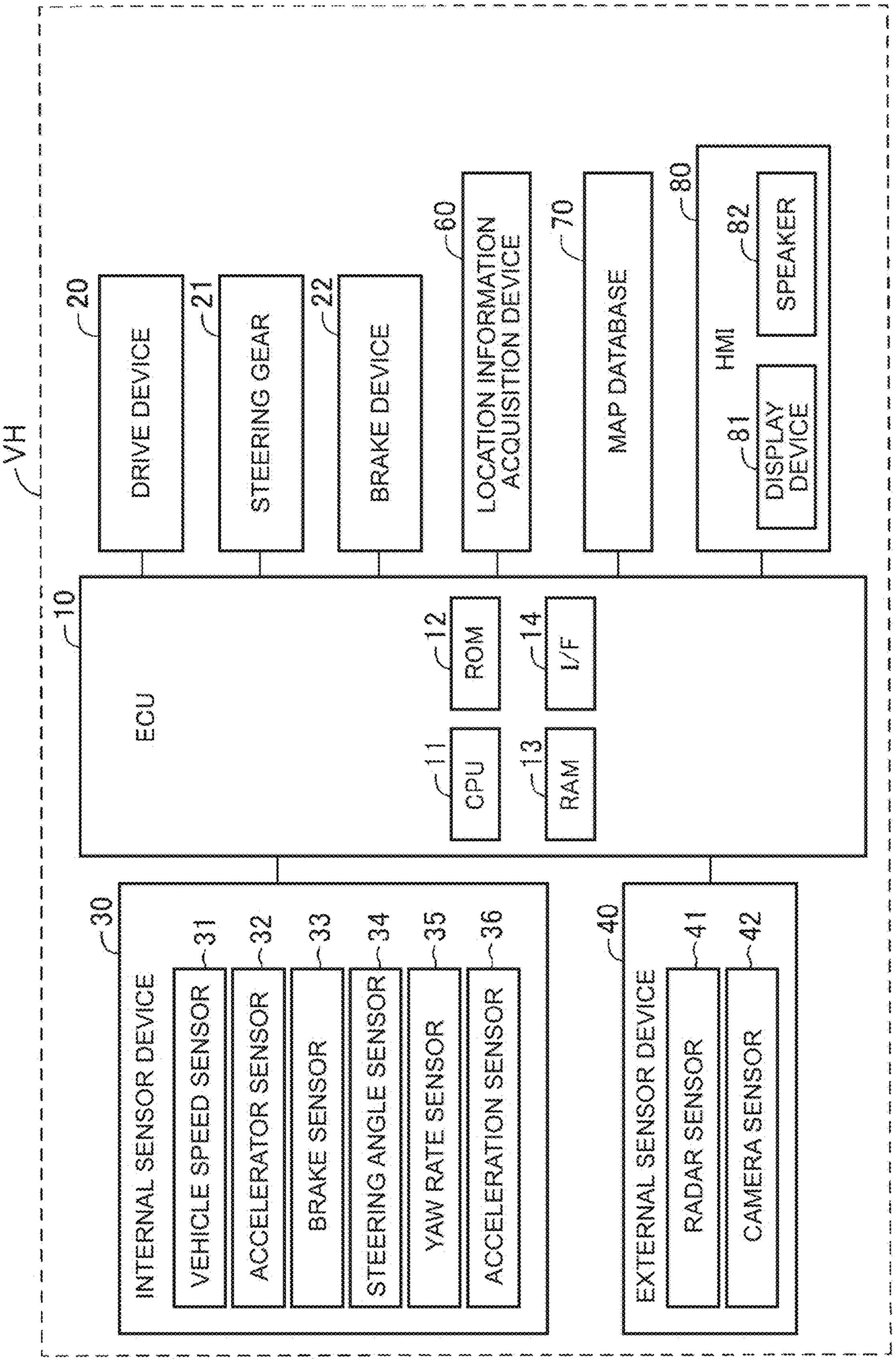
FIG. 1 is a schematic diagram illustrating a hardware configuration of a vehicle according to the present embodiment.

FIG. 1 is a schematic diagram illustrating a hardware configuration of a vehicle VH according to the present embodiment. In the following description, the vehicle VH may be referred to as a host vehicle when it needs to be distinguished from other vehicles or the like.

The vehicle VH has an ECU (Electronic Control Unit) 10. ECU 10 includes CPU (Central Processing Unit) 11, ROM (Read Only Memory) 12, RAM (Random Access Memory) 13, and interface device 14. CPU 11 is a processor that executes various programs stored in ROM 12. ROM 12 is a non-volatile memory that stores data and the like required for CPU 11 to execute various programs. RAM 13 provides a working area to be deployed when various programs are executed by CPU 11. The interface device 14 is a communication device for communicating with an external device.

ECU 10 is a central device for assisting the driving of VH. Driving assistance is a concept including automatic driving. In the present embodiment, ECU 10 performs secondary collision-damage mitigation control described later. The secondary collision damage mitigation control is a control for mitigating the secondary collision damage by generating a braking force in the host vehicle VH when the accelerator sudden depression is detected and a light collision of the host vehicle VH is detected.

The "accelerator sudden depression operation" is an operation in which the driver depresses the accelerator pedal deeply and quickly. This accelerator sudden depression operation mainly occurs when the driver accidentally depresses the accelerator pedal while having an intention to depress the brake pedal. Hereinafter, an operation in which the driver forcibly depresses the accelerator pedal contrary to the intention will be referred to as an erroneous depression operation. The "light collision" is a low-level collision in which the airbag is not deployed. The term "secondary collision" means that the vehicle VH further moves after collision and collides with another object.

The vehicle VH includes an airbag control device (not shown), and is configured to deploy the airbag when a collision at a preset level is detected. The airbag control device deploys the airbag and simultaneously activates the secondary collision damage mitigation brake. In the present embodiment, ECU 10 performs the secondary collision damage reduction control when a particular condition is detected separately from the secondary collision damage reduction braking by the airbag control device. When a particular condition is detected, it is a case where a sudden accelerator depression is detected and a light collision of the own-vehicle VH is detected. As a result, the application range of the secondary impact damage mitigation control is expanded to the light collision level.

A drive device 20, a steering device 21, a braking device 22, an internal sensor device 30, and an external sensor device 40 are communicably connected to ECU 10. Further, a position information acquiring device 60, a map database 70, an HMI (Human Machine Interface) 80, and the like are communicably connected to ECU 10.

The drive device 20 generates a driving force to be transmitted to the driving wheels of the vehicle VH. Examples of the drive device 20 include an electric motor and an engine. In the present embodiment, the vehicle VH may be any one of a hybrid electric vehicle (HEV), a plug-in hybrid vehicle (PHEV), and a fuel cell electric vehicle (FCEV). Alternatively, the vehicle VH may be battery electric vehicle (BEV) or an engine-driven vehicle. The steering device 21 applies a steering force to the wheels of the vehicle VH. The braking device 22 applies a braking force to the wheels of the vehicle VH.

The internal sensor device 30 is a sensor for acquiring the condition of the vehicle VH. The internal sensor device 30 includes a vehicle speed sensor 31, an accelerator sensor 32, a brake sensor 33, a steering angle sensor 34, a yaw rate sensor 35, an acceleration sensor 36, and the like.

The vehicle speed sensor 31 detects a traveling speed (vehicle speed) of the vehicle VH. The accelerator sensor 32 detects an operation amount of an accelerator pedal (not shown) by a driver. The brake sensor 33 detects an operation amount of a brake pedal (not shown) by the driver. The steering angle sensor 34 detects a rotation angle (steering angle) of a steering wheel or a steering shaft (not shown). The yaw rate sensor 35 detects the yaw rate of the vehicle VH. The acceleration sensor 36 detects an acceleration of the vehicle VH. The internal sensor device 30 transmits the condition of the vehicle VH detected by the sensors 31 to 36 to ECU 10 at a predetermined cycle.

The external sensor device 40 is a sensor or the like that recognizes target information related to a target in the vicinity of VH. The external sensor device 40 includes a radar sensor 41, a camera sensor 42, and the like. Here, the target information includes, for example, a surrounding vehicle, a white line of a road, a road sign, and the like.

The radar sensor 41 detects a target that is present around the vehicle VH. The radar sensor 41 includes a millimeter wave radar and/or a lidar. Millimeter-wave radar radiates radio waves in the millimeter-wave band and receives millimeter waves reflected by targets present in the radiation range. The millimeter wave radar acquires the relative distance, the relative speed, and the like between the vehicle VH and the target on the basis of the phase difference between the transmitted millimeter wave and the received reflected wave, the attenuation level of the reflected wave, the time from the transmission of the millimeter wave to the reception of the reflected wave, and the like. The lidar sequentially scans the pulsed laser light having a wavelength shorter than the millimeter wave toward a plurality of directions, and receives the reflected light reflected by the target, thereby acquiring the shapes of the targets detected around the vehicle VH, the relative distances between the vehicle VH and the targets, the relative velocities, and the like.

The camera sensor 42 captures an image of the surroundings of the vehicle VH and processes the captured image-data to acquire target object information around the vehicle VH. As the camera sensor 42, for example, a digital camera having an image sensor such as a CMOS or a CCD can be used. The target information is information indicating a type of a target detected around the vehicle VH, a relative distance between the vehicle VH and the target, a relative speed, and the like. The type of the target may be recognized by machine learning such as pattern matching, for example.

The external sensor device 40 repeatedly transmits the acquired target object data to ECU 10 every time a predetermined period elapses. Note that the external sensor device 40 does not necessarily have to include both the radar sensor 41 and the camera sensor 42, and may include, for example, only the camera sensor 42.

The position information acquiring device 60 acquires the present position information of the vehicle VH. As the position-information acquiring device 60, for example, a GPS (Global Positioning System), a GNSS (Global Navigation Satellite System) or the like which is provided in a navigation system (not shown) can be used. The position information acquiring device 60 transmits the acquired present position information of the vehicle VH to ECU 10 at a predetermined cycle.

The map database 70 is a database of map information, and is stored in a storage device (a hard disk, a flash memory, or the like) included in the vehicle VH. The map information includes, for example, position information of a public parking lot or the like. The map database 70 may be stored in an external server capable of communicating with the vehicle VH. In this case, VH may acquire the map-information from the external servers through a communication device (not shown).

HMI 80 is an interface for inputting and outputting data between ECU 10 and drivers, and includes an input device and an output device. Examples of the input device include a touch panel, a switch, and a sound pickup microphone. Examples of the output device include a display device 81 and a speaker 82. The display device 81 is, for example, a center display, a multi-information display, a head-up display, or the like. The speaker 82 is, for example, a speaker of an acoustic system or a navigation system.

Software Configuration

Figure 2:
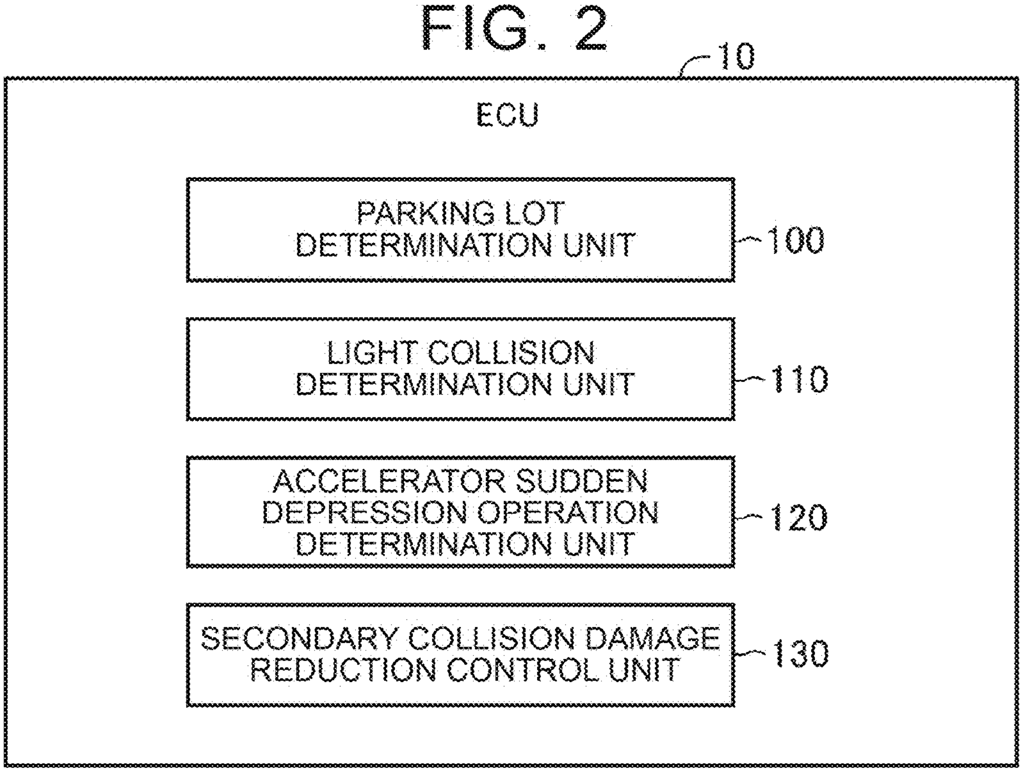
FIG. 2 is a schematic diagram illustrating a software configuration of the control device according to the present embodiment.

FIG. 2 is a schematic diagram illustrating a software configuration of the control device according to the present embodiment.

As illustrated in FIG. 2, ECU 10 includes a parking lot determination unit 100, a light collision determination unit 110, an accelerator sudden depression operation determination unit 120, a secondary collision damage reduction control unit 130, and the like as functional elements. These functional elements 100 to 130 are realized by CPU 11 of ECU 10 reading a program stored in ROM 12 into a RAM 13 and executing the program. Note that all or a part of the functional elements 100 to 130 may be provided in another ECU separate from ECU 10 or in an information processing device of a facility (e.g., a control center) capable of communicating with the vehicle VH.

The in-parking-lot determination unit 100 determines whether or not the own-vehicle VH is present in a public parking lot, a parking lot of a shop or an apartment house, or the like. Specifically, the parking lot determination unit 100 determines that the host vehicle VH is present in the parking lot when detecting a parking lot line for partitioning a parking frame such as a white line or another vehicle being stopped in the parking frame, based on the road surface images of the surroundings of the host vehicle VH captured by the camera sensor 42. In addition, in the parking lot determination unit 100, the present position of the host vehicle VH may be within a predetermined distance (for example, several meters) from a position such as a public parking lot, a parking lot of a shop or an apartment house registered in the map information of the map database 70. In this case, it is determined that the own-vehicle VH exists in the parking lot. The present position of the own-vehicle VH is acquired by the position-information acquiring device 60. The parking lot determination unit 100 transmits the determination result to the light collision determination unit 110 and the secondary collision damage reduction control unit 130.

Figure 3:
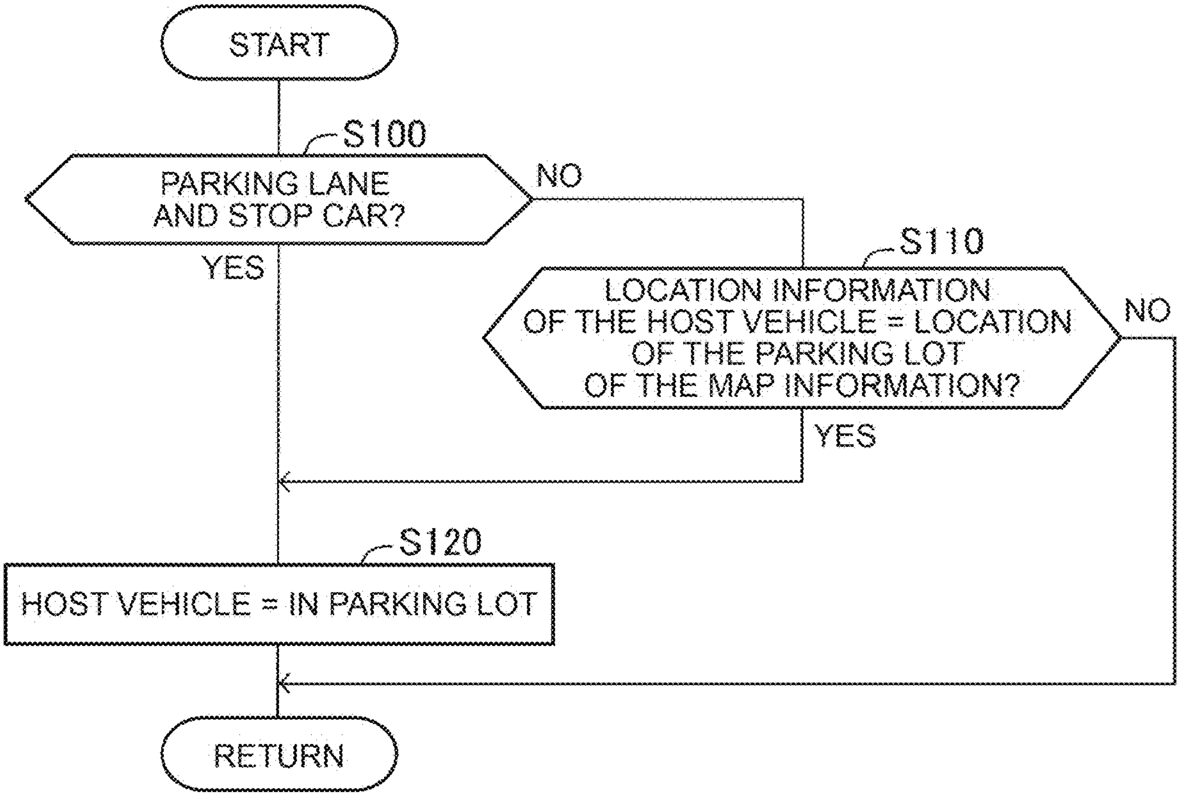
FIG. 3 is a flow chart for explaining a routine of the parking lot determination process according to the present embodiment.

FIG. 3 is a flow chart for explaining a routine of a parking lot determination process executed by CPU 11 of ECU 10. This routine is started, for example, when the power switch or the ignition switch of the vehicle VH is turned on, and ends when the power switch or the ignition switch is turned off. The present routine may be terminated once the vehicle speed of the vehicle VH has risen to the predetermined speed, and the present routine may be resumed when the vehicle speed of the vehicle VH has fallen to the predetermined speed.

In S100, ECU 10 determines whether a parking lot line such as a white line or another vehicle (stopped vehicle) is detected around the host vehicle VH on the basis of the detection result of the camera sensor 42. If a parking lot line or another vehicle at a stop is detected (Yes), ECU 10 proceeds to S120 process and determines that the host vehicle VH is present in the parking lot. On the other hand, when none of the parking lot line and the other vehicles being stopped are detected (No), ECU 10 proceeds to S110 process.

When proceeding to S110 process, ECU 10 determines whether or not the present position of the own-vehicle VH acquired by the position information acquiring device 60 is within a predetermined distance range from the position of the public parking lot, the parking lot of the shop, or the like registered in the map information of the map database 70. If it is within the predetermined range, ECU 10 proceeds to S120 process and determines that the host vehicle VH is within the parking lot. On the other hand, if it is not within the predetermined range (No), ECU 10 returns.

The light collision determination unit 110 determines whether or not a light collision has occurred. The light collision determination unit 110 stores a light collision determination condition set in advance, and determines that a light collision has occurred when the light collision determination condition is satisfied. The light collision determination unit 110 transmits the determination result to the secondary collision damage reduction control unit 130.

When both of the following determination condition A1, A2 are satisfied, the light collision determination unit 110 determines that the light collision determination condition is satisfied.

Condition A1: The acceleration G of the vehicle VH exceeds the reference acceleration threshold Gath.

Conditional A2: The integrated value G of the acceleration G of the vehicle VH exceeds the reference integration threshold Gath.

When the condition A1 is satisfied and the condition A2 is satisfied, the light collision determination unit 110 determines that a light collision has occurred in the host-vehicle VH. The acceleration G of the vehicle VH is acquired by the acceleration sensor 36. The acceleration G of the vehicle VH and the integrated value G of the acceleration G are used as collision index values representing the degree of collision of the host vehicle VH.

The integrated value G of the acceleration G is, for example, a value obtained by integrating the acceleration G during a period from the start timing to the end timing shown below. The start timing is a timing at which the section integration value of the acceleration G (the integration value G of the acceleration G in the preset section width) exceeds the section integration threshold value. The end timing is a timing at which a predetermined time has elapsed after the interval integration value of the acceleration G falls below the interval integration threshold value. The light collision determination unit 110 detects the start timing and the end timing by repeatedly calculating the interval integral value at a predetermined calculation cycle.

The reference acceleration threshold Gath and the reference integration threshold Gath in the determination condition A1, A2 are set to be lower than the collision level at which the airbag control device deploys the airbag. Therefore, it is possible to determine the occurrence of the light collision based on the light collision determination condition. For example, when the host vehicle VH is traveling on a rough road, the acceleration G may instantaneously exceed the reference acceleration threshold Gath. Therefore, it is difficult to accurately determine whether a light collision occurs or not only by the determination condition A1, and whether a light collision occurs or not. On the other hand, when a light collision occurs, the integrated value G of the acceleration G becomes a larger value than when the vehicle travels on a rough road. Therefore, in the present embodiment, by adding the determination condition A2, it is possible to prevent the influence of the traveling on the adverse road from being included as much as possible in the determination result of the presence or absence of the occurrence of the light collision.

Here, it is assumed that VH of the vehicle is located in the parking lot and the driver performs an erroneous depression of the accelerator pedal suddenly. In such cases, the vehicle VH is highly likely to collide with the surrounding target at a very low speed, and accelerations at the time of collision are also reduced. Therefore, even if the vehicle VH actually collides with the surrounding target in the parking lot, there is a possibility that the above-described determination condition A1, A2 is not satisfied and it is not determined that a light collision has occurred. On the other hand, if the determination condition A1, A2 is uniformly relaxed, there is a problem that the light collision determination condition is easily satisfied, for example, when the vehicle VH is traveling on a bad road. Therefore, the light collision determination unit 110 relaxes the determination-condition A1, A2 only when the parking lot determination unit 100 determines that the own-vehicle VH exists in the parking lot.

Specifically, when it is determined that the own-vehicle VH exists in the parking lot, the light collision determination unit 110 corrects the reference acceleration threshold Gath to a smaller acceleration threshold Gbth (Gbth<Gath). Hereinafter, the acceleration threshold Gbth is referred to as a "corrected acceleration threshold". In addition, when it is determined that the own-vehicle VH is present in the parking lot, the light collision determination unit 110 corrects the reference integration threshold ¯Gath to a smaller integration threshold ¯Gbth (¯Gbth<∫Gath). In the following description, the integration threshold ¯Gbth is referred to as a "post-correction integration threshold". As described above, when it is determined that the host vehicle VH exists in the parking lot, the light collision can be effectively determined even when the vehicle VH collides with the surrounding target at the very low speed by relaxing the determination-condition A1, A2. In addition, by reducing the determination condition A1, A2 only in the parking lot, it is possible to effectively suppress erroneous determination that the change in the acceleration when the vehicle VH travels on a rough road or the like is a light collision.

The accelerator sudden depression operation determination unit 120 determines whether or not an accelerator sudden depression operation has been performed in order to estimate whether or not an erroneous depression operation of the driver has occurred. The accelerator sudden depression operation determination unit 120 stores a preset accelerator sudden depression operation determination condition, and determines that the accelerator sudden depression operation has been performed when the accelerator sudden depression operation determination condition is satisfied. The accelerator sudden depression operation determination unit 120 transmits the determination result to the secondary collision damage reduction control unit 130.

The accelerator sudden depression operation determination condition is set as follows.

Conditional B1: The accelerator pedal operation amount AC is equal to or greater than the threshold ACth1, and the accelerator pedal operation speed ACV is equal to or greater than the threshold ACVth.

Condition B2: Within a set time Tth (a predetermined time in the present disclosure) after the condition B1 is satisfied, the accelerator pedal-operation-amount AC becomes equal to or larger than the threshold ACth2. However, the threshold ACth2 is set to be larger than the threshold ACth1.

When the condition B2 is satisfied, the accelerator sudden depression operation determination unit 120 determines that the accelerator sudden depression operation determination condition is satisfied and the accelerator sudden depression operation is performed. The accelerator pedal operation amount AC represents an accelerator operation amount detected by the accelerator sensor 32. The accelerator pedal operation speed ACV represents a change amount of the accelerator pedal operation amount AC per unit time, that is, a differential value of the accelerator pedal operation amount AC. Note that the accelerator sudden depression manipulation determination condition may be, for example, only the condition B1.

The accelerator sudden depression operation end determination condition is set as follows.

The accelerator pedal-operated value AC must decrease to below the threshold ACth3. The threshold value ACth3 is a value smaller than the threshold value ACth1, and is set to a value for determining that the accelerator pedal has been returned to the low opening position (for example, several %). When the accelerator sudden depression operation end determination condition is satisfied, the accelerator sudden depression operation determination unit 120 determines that the accelerator sudden depression operation has ended. When the accelerator sudden depression operation end determination condition is satisfied, the accelerator sudden depression operation determination unit 120 transmits the determination result to the secondary collision damage reduction control unit 130.

The accelerator sudden depression operation determination unit 120 transmits an accelerator sudden depression operation notification command to HMI 80 while determining that the accelerator sudden depression operation is being performed. While receiving the accelerator sudden depression notification command, HMI 80 outputs a warning sound (for example, a buzzer sound) from the speaker 82, and displays a warning screen prompting the driver to release the foot from the accelerator pedal on the display device 81.

The secondary collision damage reduction control unit 130 performs the secondary collision damage reduction control for reducing the secondary collision damage of the host vehicle VH by generating a braking force on the host vehicle VH and suppressing the driving force. In this embodiment, the secondary collision damage reduction control unit 130 implements two types of control of braking force generation control and driving force inhibition control as the secondary collision damage reduction control. The braking force generation control is a control for operating the braking device 22 so as to obtain a desired deceleration for reducing secondary collision damage. Accordingly, it is possible to forcibly decelerate the own-vehicle VH without requiring the driver to operate the brake pedal. The driving force suppression control is a control for limiting the output torque of the drive device 20. Accordingly, even when the driver depresses the accelerator pedal, the required torque of the driver is not accepted, and the acceleration motion of the host vehicle VH can be suppressed.

The secondary collision damage reduction control unit 130 executes the secondary collision damage reduction control when the light collision determination unit 110 determines that a light collision has occurred in the host vehicle VH and the accelerator sudden depression operation determination unit 120 determines that an accelerator sudden depression operation has been performed. Accordingly, the secondary collision damage can be effectively reduced when a light collision occurs in the host-vehicle VH. After executing the secondary collision damage mitigation control, the secondary collision damage reduction control unit 130 terminates the secondary collision damage mitigation control when the accelerator sudden depression operation determination unit 120 determines that the accelerator sudden depression operation has ended.

When the secondary collision damage reduction control is executed, if both the braking force generation control and the driving force suppression control are performed, for example, if the own-vehicle VH is present in the parking lot, there is a high possibility that the driver unintentionally erroneously depresses the accelerator pedal. Therefore, the secondary collision damage can be effectively reduced. However, when the host vehicle VH does not exist in the parking lot, there is a possibility that the accelerator sudden operation of the driver is an avoidance operation for mitigating damage to a collision with another vehicle. Even in such a case, if the braking force generation control is executed as the secondary collision damage reduction control, the driver feels uncomfortable due to the unnecessary operation of the brake.

Therefore, the secondary collision damage reduction control unit 130 of the present embodiment turns on the braking force activation permission flag F (F=1) only when the parking lot determination unit 100 determines that the own-vehicle VH exists in the parking lot. That is, the secondary collision damage reduction control unit 130 may be configured such that, in a situation where the light collision determination unit 110 determines that a light collision has occurred in the host vehicle VH and the accelerator sudden depression operation determination unit 120 determines that the accelerator sudden depression operation has been performed, the braking force activation permission flag F is on (F=1) (in a case where the host vehicle VH is present in the parking lot). Only in this case, both the braking force generation control and the driving force suppression control are performed as the secondary collision damage reduction control. On the other hand, the secondary collision damage reduction control unit 130 may determine that a light collision has occurred in the host vehicle VH by the light collision determination unit 110 and that an accelerator sudden depression operation has been performed by the accelerator sudden depression operation determination unit 120, and may determine that the braking force activation permission flag F is off (F=0) (when the host vehicle VH does not exist in the parking lot). In this case, only the driving force suppression control is performed as the secondary collision damage reduction control. This makes it possible to effectively suppress unnecessary operation of the braking force generation control.

Figure 4:
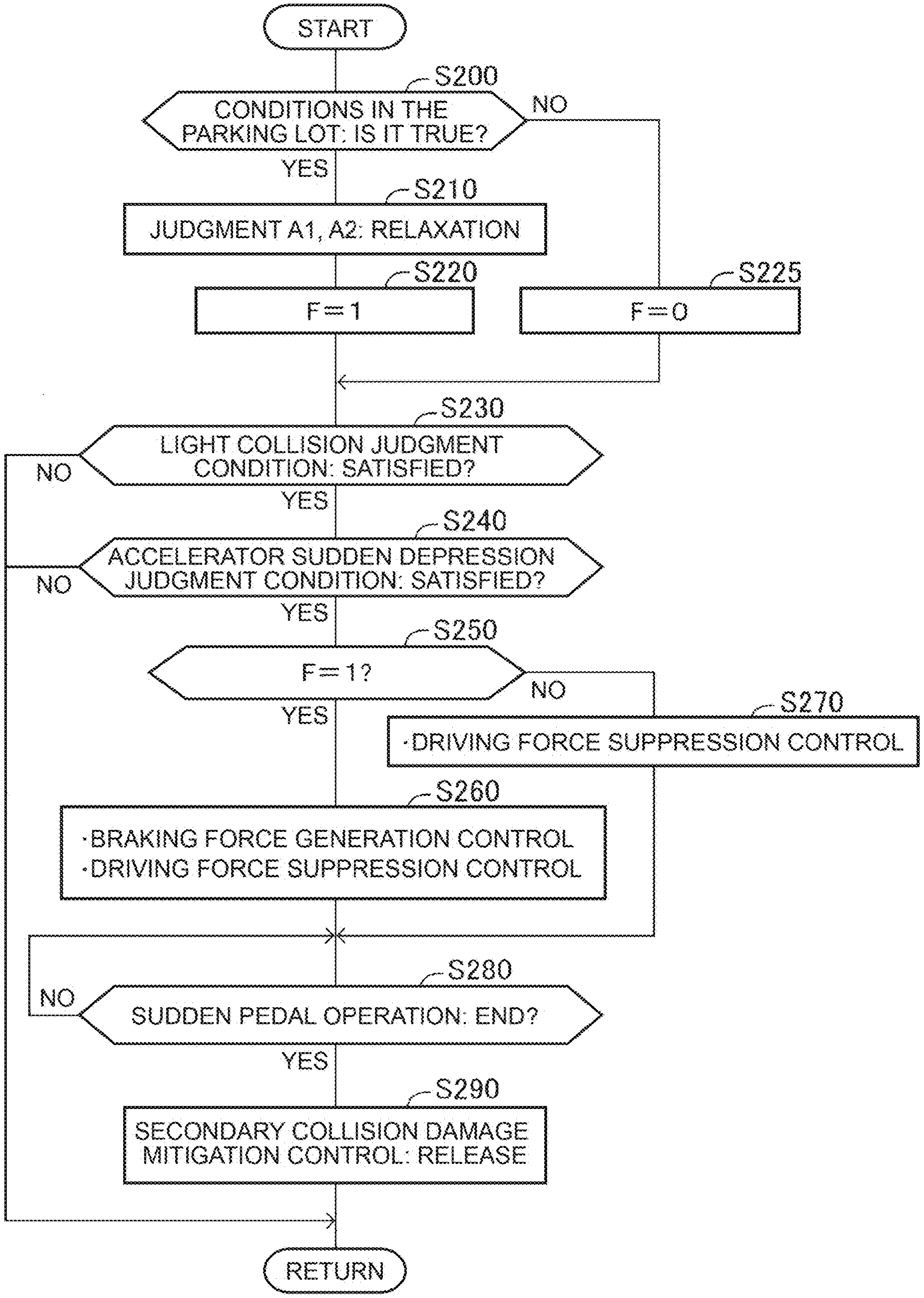
FIG. 4 is a flowchart for explaining a routine of processing of light collision determination, accelerator sudden depression operation determination, and secondary collision damage mitigation control according to the present embodiment.

FIG. 4 is a flow chart for explaining routines of the processes of the light collision determination, the accelerator sudden depression operation determination, and the secondary collision damage mitigation control executed by CPU 11 of ECU 10. This routine is executed in parallel with the routine of the parking lot determination processing shown in FIG. 3.

In S200, ECU 10 determines whether or not the parking lot in-vehicle VH is determined to exist in the parking lot by the parking lot in-vehicle determination process illustrated in FIG. 3. In S200, if the parking lot conditions are satisfied (Yes), ECU 10 proceeds to S210 process. In S210, the above-described determination-condition A1, A2 is relaxed. That is, the reference acceleration threshold Gath is changed to the corrected acceleration threshold Gbth, and the reference integration threshold ¯Gath is changed to the corrected integration threshold ¯Gbth. Next, the process proceeds to S220 process, and the braking force activation permission flag F is turned on (F=1). Note that S210 and S220 processes may be performed in any order and may be performed simultaneously.

On the other hand, in S200, when the parking lot condition is not satisfied (No), ECU 10 proceeds to S225 process and turns off the braking force activation permission flag F (F=0).

When the process proceeds from S220 or S225 to S230 process, ECU 10 determines whether or not the light collision determination condition is satisfied, that is, whether or not the above-described condition A1 and condition A2 are satisfied. At this time, when ECU 10 proceeds from S220 to S230 process, the determination is performed based on the corrected acceleration threshold Gbth and the corrected integration threshold Gbth (relaxed condition). When the process proceeds from S225 to S230 process, the determination is performed based on the reference acceleration threshold Gath and the reference integration threshold¯Gath. When the light collision determination condition is satisfied (Yes), ECU 10 proceeds to S240 process. On the other hand, if the light collision determination condition is not satisfied (No), ECU 10 returns this routine.

In S240, ECU 10 determines whether or not the accelerator sudden depression manipulation determination condition is satisfied, that is, whether or not the above-described condition B1 and condition B2 are satisfied. When the accelerator sudden depression operation determination condition is satisfied (Yes), ECU 10 proceeds to S250 process. On the other hand, if the accelerator sudden depression operation determination condition is not satisfied (No), ECU 10 returns. Note that S230 and S240 processes may be performed in any order and may be performed simultaneously.

In S250, ECU 10 determines whether or not the braking force activation permission flag F is turned on (F=1). When the braking force activation permission flag F is turned Yes, that is, when the own-vehicle VH is present in the parking lot, ECU 10 proceeds to S260 process and executes both the braking force generation control and the driving force suppression control as the secondary collision damage reduction control. On the other hand, when the braking force activation permission flag F is not turned on (No), that is, when the host vehicle VH is not present in the parking lot, ECU 10 proceeds to S270 process, and executes only the driving force suppression control as the secondary collision damage reduction control.

In S280, ECU 10 determines whether or not the accelerator sudden depression has been completed. If the accelerator sudden depression has not been completed (No), ECU 10 repeats the determination of S280. That is, the secondary collision damage mitigation control is continuously executed. On the other hand, when the accelerator sudden depression is completed (Yes), ECU 10 proceeds to S290 process, releases the secondary collision damage mitigation control, and returns to this routine.

Although the vehicle control device and the vehicle control method according to the present embodiment have been described above, the present disclosure is not limited to the above-described embodiment, and various modifications can be made without departing from the object of the present disclosure.

What is claimed is:

1. A vehicle control device comprising a processor configured to:

determine whether a sudden depression operation of an accelerator pedal is performed by a driver of a vehicle;

determine whether a light collision has occurred in the vehicle;

execute at least one of driving force suppression control for suppressing a driving force of the vehicle or braking force generation control for generating a braking force in the vehicle, as secondary collision damage reduction control, in response to a control execution condition that the sudden depression operation of the accelerator pedal was performed within a predetermined time and the light collision has occurred in the vehicle being satisfied; and determine whether the vehicle is present in a parking lot, wherein at least one of a content of control executed as the secondary collision damage reduction control or the control execution condition is changed in accordance with a determination of whether the vehicle is present in the parking lot.

2. The vehicle control device according to claim 1, wherein it is made easier to determine occurrence of the light collision in a case that the vehicle is present in the parking lot, than in a case that the vehicle is not present in the parking lot, by changing a threshold that is used for determination of whether the light collision has occurred in the vehicle.

3. The vehicle control device according to claim 1, wherein when the control execution condition is satisfied, execution of the braking force generation control as the secondary collision damage reduction control is permitted in response to determining that the vehicle is present in the parking lot, and the execution of the braking force generation control as the secondary collision damage reduction control is not permitted in response to determining that the vehicle is not present in the parking lot.

4. The vehicle control device according to claim 1, wherein the processor determines that the vehicle is present in the parking lot when a parking lot line is detected from a road surface image of a surrounding of the vehicle captured by a camera sensor, or the vehicle is within a predetermined distance from a registered parking lot in a map database.

5. A vehicle control method of executing at least one of driving force suppression control for suppressing a driving force of a vehicle or braking force generation control for generating a braking force in the vehicle, as secondary collision damage reduction control, when a control execution condition that a sudden depression operation of an accelerator pedal was performed by a driver of the vehicle within a predetermined time and it is determined that a light collision has occurred in the vehicle is satisfied, the vehicle control method comprising executing a parking lot determination as to whether the vehicle is present in a parking lot, and changing at least one of a content of control executed as the secondary collision damage reduction control or the control execution condition in accordance with a determination of whether the vehicle is present in the parking lot.

* * * * *